United States Patent [19]
Meadows

[11] 3,863,515
[45] Feb. 4, 1975

[54] ENDLESS POWER TRANSMISSION BELT

[75] Inventor: Roger D. Meadows, Waynesville, N.C.

[73] Assignee: Dayco Corporation, Dayton, Ohio

[22] Filed: Apr. 19, 1973

[21] Appl. No.: 352,786

[52] U.S. Cl. .............................. 74/231 R, 74/232
[51] Int. Cl. ............................................. F16g 1/00
[58] Field of Search ............................. 74/231–234, 74/236, 237, 238; 198/193, 194, 184

[56] References Cited
UNITED STATES PATENTS
| | | | |
|---|---|---|---|
| 3,181,690 | 5/1965 | Jenkins | 74/237 X |
| 3,212,627 | 10/1965 | Beebee | 74/232 X |
| 3,656,360 | 4/1972 | Fix | 74/237 X |

Primary Examiner—Samuel Scott
Assistant Examiner—Frank H. McKenzie, Jr.

[57] ABSTRACT

A V-belt comprising a tension section, a compression section, and a load-carrying section arranged between the tension and compression sections with the load-carrying section comprising a longitudinally extending cord and a plurality of parallel cords arranged in skewed relation relative to the longitudinally extending cord and on at least one side thereof with the skewed cords cooperating with the longitudinally extending cord to provide the belt with improved strength and torsional stiffness yet the desired flexibility.

13 Claims, 3 Drawing Figures

PATENTED FEB 4 1975

3,863,515

ENDLESS POWER TRANSMISSION BELT

BACKGROUND OF THE INVENTION

There are numerous endless power transmission belts, popularly referred to as V-belts, in current use which vary in construction to meet specific requirements of the application for which each of such belts is normally expected to be used. These current belts fall into roughly two basic categories. Each belt in the first category employs a load-carrying section defined by a single layer or ply of load-carrying material and each belt in this category is referred to as a single ply neutral axis belt. Each belt in the second category employs a load-carrying section defined by a plurality of multiple layers or plies of load-carrying material which are arranged in parallel relation and each belt in this category is often referred to as a multiple ply neutral axis belt.

In general, the single ply neutral axis belts have increased flexibility but are subject to whip and tend to roll over in their associated sheaves. On the other hand, the multiple ply neutral axis belts have greater tensile strength and torsional stiffness whereby the tendency of such multiple ply neutral axis belts to roll over is substantially less. However the major disadvantage with previously proposed multiple ply neutral axis belts is caused because some of the plies of each of such belts are in substantial tension as the belt bends around an associated sheave while others of the plies are in substantial compression as the belt bends around the associated sheave resulting in comparatively high shear forces which tend to shear various plies and these shear forces cause excessive heat buildup and a resultant rapid deterioration of the belt.

Therefore, it is apparent that it would be advantageous to have a belt which has a flexibility approaching the so-called single ply neutral axis belt yet which has the tensile strength and torsional stiffness approaching the so-called multiple ply neutral axis belt.

SUMMARY

This invention provides a simple endless power transmission belt which has the increased flexibility typical of a single ply neutral axis belt yet has the tensile strength and torsional stiffness which is typical of a multiple ply netural axis belt. In particular, such belt is comprised of a tension section, a compression section, and a load-carrying section arranged between the tension and compression sections with the load-carrying section having a longitudinally extending load-carrying cord and a plurality of parallel cords arranged in skewed relation relative to the longitudinally extending cord and on at least one side thereof with the skewed cords cooperating with the load-carrying cord to assure that the belt has a comparatively high tensile strength and improved torsional stiffness yet has the desired flexibility.

Other details, uses, and advantages of this invention will be readily apparent from the embodiments thereof presented in the following specification, claims, and drawing.

BRIEF DESCRIPTION OF THE DRAWING

The accompanying drawing shows a present preferred embodiment of this invention, in which.

DESCRIPTION OF ILLUSTRATED EMBODIMENTS

Figure 1:
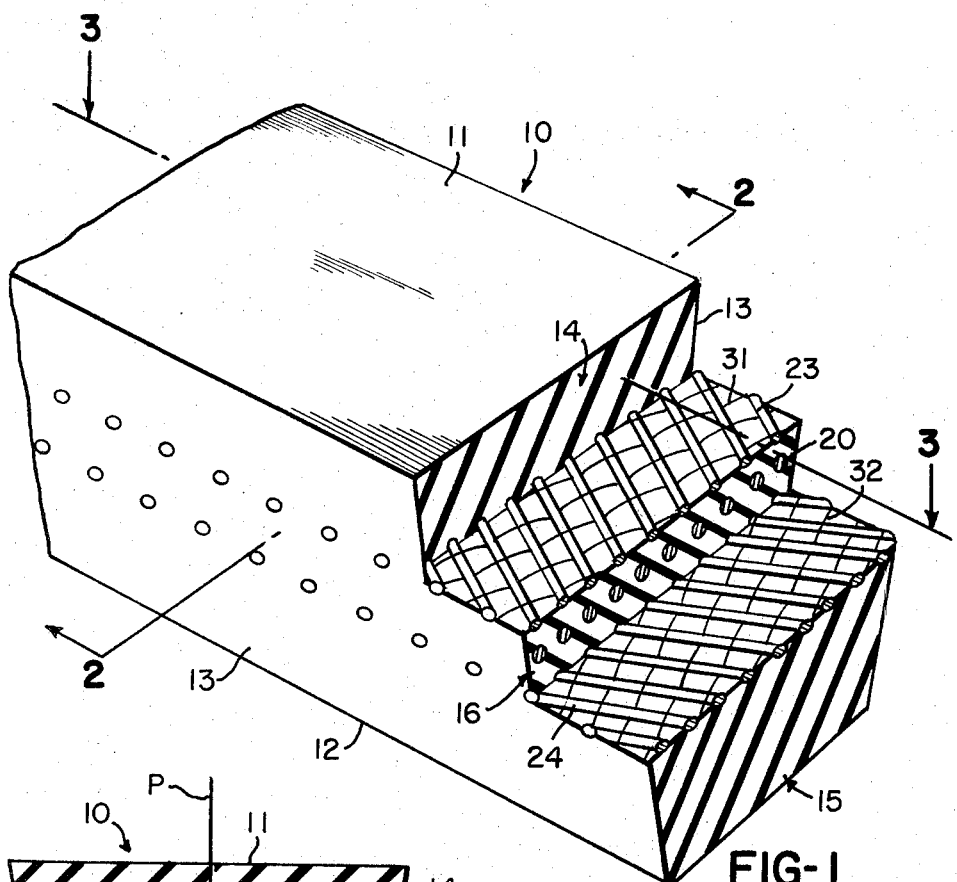
FIG. 1 is a perspective view with parts in elevation, parts in cross section, and parts broken away, illustrating one exemplary embodiment of the endless power transmission belt of this invention.

Reference is now made to FIG. 1 of the drawing which illustrates one exemplary embodiment of an endless power transmission belt of this invention which is designated generally by the reference numeral 10. The belt 10 is popularly referred to as a V-belt and as will be apparent from the drawing has a substantially trapezoidal cross-sectional configuration and hence trapezoidal peripheral outline which is defined by a top wall 11, a bottom wall 12 which is arranged parallel to the top wall 11, and a pair of opposed side walls or nonparallel sides 13.

The belt 10 has compratively great flexibility similar to a power transmission belt of the type which has a load-carrying cord arranged in a single layer. In addition, the belt 10 has comparatively great tensile strength and torsional stiffness which is typical of a power transmission belt of the type which has a load-carrying section defined by a plurality of plies and as will be apparent from the following description.

Figure 2:
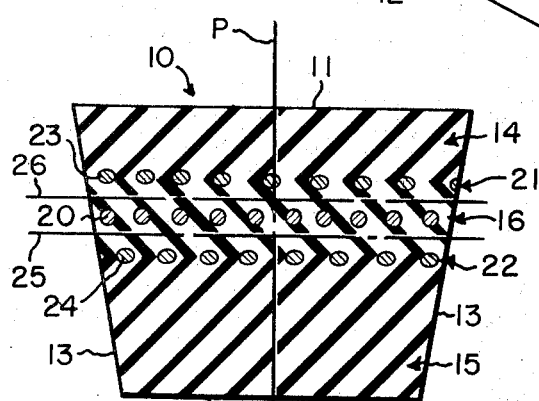
FIG. 2 is a cross-sectional view taken essentially on the line 2—2 of FIG. 1.

As seen particularly in FIG. 2, the belt 10 comprises a tension section 14, a compression section 15, and a load-carrying section which is designated generally by the reference numeral 16 and is arranged between the tension and compression sections 14 and 15 respectively. The load-carrying section is arranged in parallel relation with the top wall 11 and bottom wall 12 of the belt 10.

The load-carrying section 16 comprises a spirally wound load-carrying cord 20 which extends substantially longitudinally through the belt and is arranged in a single layer and such cord may be referred to as the primary neutral axis ply of the load-carrying section 16. The load-carrying section 16 also has a layer of cords on each side of the longitudinally extending cord 20 and the top layer of such cords is designated generally by the reference numeral 21 while the bottom layer of such cords is designated generally by the reference numeral 22 and the layers 21 and 22 may be considered or referred to as the secondary neutral axis plies of the load-carrying section 16.

While the belt is operating in a pulley groove during transmission of power, the top wall 11 should be considered the outer surface of the belt, and the bottom wall 10 should be considered the inner surface of the belt. This means that the layer 21 is outward of the load-carrying cord 20 and the layer 22 is inward of the load-carrying cord 20.

The layer 21 has a plurality of parallel cords 23 which are arranged in skewed relation relative to the longitudinally extending cord 20 and similarly the layer 22 has a plurality of parallel cords 24 arranged in skewed relation relative to the longitudinally extending cord 20, but in an oppositely extending direction. The skewed cords 23 and 24 cooperate with the longitudinally extending cord 20 to increase the tensile strength or torsional stiffness of the belt 10, however, the cords 23 and 24, due primarily to their skewed arrangement, are adapted to elongate and compress respectively a sufficient amount relative to the spirally wound longitudinally extending cord 20 to keep the shear forces between each layer of skewed cords and the longitudinally extending cord at a minimum. In particular, the shear forces tending to cause what may be considered flow or movement in a pair of parallel planes 25 and 26 is kept at a minimum whereby the belt 10 has optimum flexibility for a multiple ply neutral axis belt yet has the comparatively great tensile strength and torsional resistance which is typical of such a multiple ply neutral axis belt.

Figure 3:
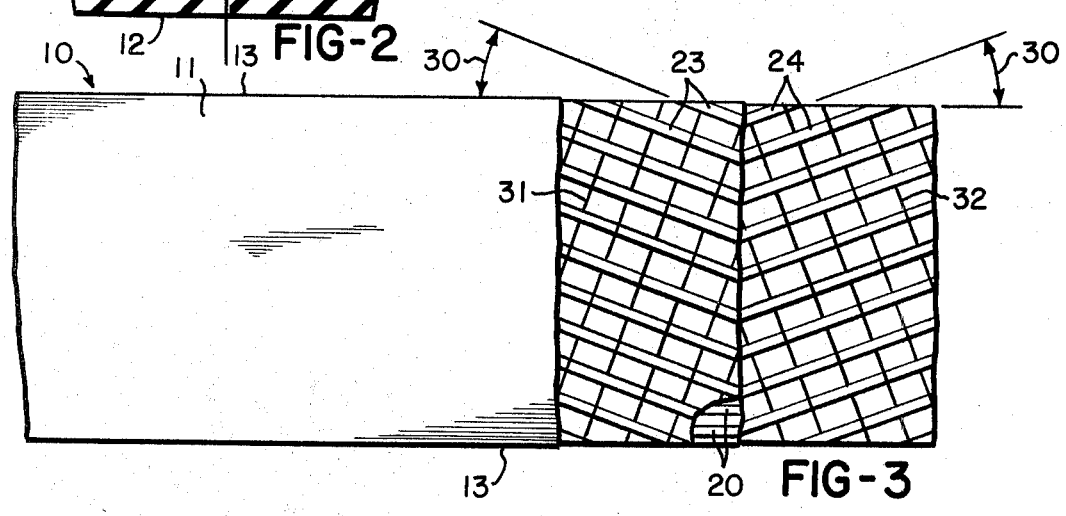
FIG. 3 is a fragmentary plan view taken essentially on the line 3—3 of FIG. 1.

As seen particularly in FIG. 3, the skewed cords 24 in the layer 22 are arranged at a particular angle 30 at one side of the longitudinally extending spirally wound cord 20 and the skewed cords 23 in the layer 21 are arranged in an oppositely extending direction at substantially the same angle 30 at the other side of the longitudinally extending cord 20. Thus, it will be seen that the skewed cords 23 and 24 extend in a symmetrical pattern on opposite sides of the longitudinally extending cord and hence in a symmetrical pattern on opposite sides of the longitudinal axis of the belt 10 and a vertical running plane P for the belt 10, shown in FIG. 2, as effectively bisecting the belt 10, whereby the load-carrying section 16 is, in essence, a structurally balanced unit and the overall belt 10 is a balanced construction capable of operating in associated sheaves with optimum efficiency.

The particular angle 30 at which the skewed cords 24 extend to one side of the longitudinally extending cord 20 and the skewed cords 23 extend to the opposite side of the longitudinally extending cord 20 or running plane P may vary depending upon the intended application of the belt 10 and the materials employed. Preferably, such angle ranges between 10° and 25° from the individual cord windings of the longitudinally extending cord 20 and hence the running plane P.

Any suitable means may be provided for holding the skewed cords 23 and 24 in parallel relation in their associated layer. For example, the cords 23 in the layer 21 or the cords 24 in the layer 22 may be held in position in parallel relation and in their skewed arrangement by the elastomeric matrix material adjoining the cords. However, the cords 23 or 24 preferably comprise the strength cords of a so-called cord fabric which is often referred to in the art as "tire cord" fabric whereby the cords 23 have comparatively weak tie strands 31 holding them substantially parallel. Similarly, the cords 24 have comparatively weak tie strands 32 holding them substantially parallel.

Regardless of the detailed manner in which the cords 23 or 24 are held in position, it will be appreciated that the unique load-carrying section 16 of the belt 10 enables such belt to be operated in comparatively small diameter sheaves due to the flexibility thereof; yet, such belt is capable of being operated under high tension and has great torsional resistance.

The belt 10 may be made using any suitable technique or apparatus known in the art. For example, a plurality of such belts may be made in an inverted manner by first winding or suitably coiling a suitable elastomeric material on a drum or cylinder to define a tension section defining portion. A load-carrying section defining portion is then defined by wrapping a first layer of tire cord fabric around the previously wrapped tension section defining portion with the strength cords arranged at the desired skew angle. A central load-carrying cord would then be spirally wound or wrapped in position after placing a desired thickness of a gum-like elastomeric material around the first layer followed by another thickness of gum-like material around the longitudinally extending cord with the load-carrying section being completed by wrapping a second layer of tire cord fabric around the last thickness of gum-like material. The second layer of tire cord fabric would have its strength cords arranged at a skew angle which is equal to the skew angle of the first layer but extends to the opposite sides of the cord windings of the spirally wound cord. The belt buildup would be completed by wrapping elastomeric material to define a compression section defining portion.

The resulting construction would be in the form of a so-called belt sleeve which would then be suitably cured and cooled. The cured sleeve would then be cut using techniques known in the art to define a plurality of belts which are identical to the belt 10.

The belt 10 is illustrated in the drawing as a so-called raw edge belt, i.e., it does not have a cover on any of its exposed surfaces; however, it will be appreciated that the belt 10 may be constructed so that any single surface, an associated pair of opposite surfaces, or the entire periphery of such belt may be covered with a suitable covering material. Further, any covering material employed may be in the form of a woven fabric, or the like, which may be suitably impregnated with an elastomeric material which is compatible with the elastomeric material used to make the belt 10.

The endless power transmission belt 10 may be made of any suitable elastomeric material, including natural rubber, synthetic rubber, or any suitable plastic material. Further, the cords 20, 23, and 24 may be made of any suitable material presently used in the manufacture of endless power transmission belts, or the like. For example, such cords may be made of any suitable metallic or non-metallic material and in the case of non-metallic materials may be made of cotton, nylon, rayon, polyester, etc.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising, a tension section, a compression section, and a load-carrying section arranged between said tension and compression sections, said load-carrying section having a longitudinally extending load-carrying cord, a first plurality of parallel cords arranged in skewed relation relative to and on one side of said longitudinally extending cord, and a second plurality of parallel cords arranged in skewed relation relative to and on the other side of said longitudinally extending cord, said skewed cords cooperating with said longitudinally extending cord to provide said belt having tensile strength and torsional stiffness as well as flexibility.

2. A belt as set forth in claim 1 in which said skewed cords on said one side of said longitudinally extending cord are arranged at an angle between 10° and 25° of said longitudinally extending cord and said skewed cords on said other side of said longitudinally extending cord are arranged at a similar angle but in an oppositely extending direction.

3. A belt as set forth in claim 1 in which said skewed cords comprise strength cords of a cord fabric and said strength cords are held in said parallel relation by comparatively weak tie strands.

4. A belt as set forth in claim 1 having a trapezoidal cross-sectional configuration and in which said tension and compression sections are each made of an elastomeric material.

5. An endless power transmission belt comprising, a tension section, a compression section, and a load-carrying section arranged between said tension and compression sections, said load-carrying section comprising a longitudinally extending load-carrying cord and a layer of cords on each side of said longitudinally extending cord, each of said layers having a plurality of parallel cords arranged in skewed relation relative to said longitudinally extending cord, said skewed cords cooperating with said longitudinally extending cord to increase the tensile strength and torsional stiffness of said belt yet said skewed cords being adapted to elongate and compress sufficiently to keep shear flow between the skewed cords and the longitudinally extending cord at a minimum and thereby assure said belt has the desired flexibility.

6. A belt as set forth in claim 5 having a substantially trapezoidal cross-sectional configuration defined by a top wall and a bottom wall arranged in parallel relation and wherein each of said layers of cords is arranged parallel to said bottom and top walls.

7. A belt as set forth in claim 6 in which said longitudinally extending cord is a spirally wound cord arranged in another layer substantially midway between said previously mentioned layers.

8. A belt as set forth in claim 6 in which said tension and compression sections are each made of an elastomeric material.

9. A belt as set forth in claim 6 in which the skewed cords in each of said layers are arranged at an angle ranging between 10° and 25° relative to said longitudinally extending cord.

10. A belt as set forth in claim 6 in which the skewed cords in one of said layers are arranged at angle of 10° to 25° of said longitudinally extending cord and the skewed cords in the other layer are arranged at a similar angle but in an oppositely extending direction whereby said skewed cords in each layer extend in a symmetrical pattern on opposite sides of said longitudinally extending cord to thereby balance said belt.

11. A belt as set forth in claim 10 and further comprising additional means holding the skewed cords in each layer substantially parallel.

12. A belt as set forth in claim 11 in which said means holding the skewed cords in each layer parallel are in the form of weak tie strands.

13. A belt as set forth in claim 12 in which said skewed cords and weak tie strands of each layer define an associated cord fabric.

* * * * *